United States Patent
Chiu et al.

(10) Patent No.: US 8,854,764 B2
(45) Date of Patent: Oct. 7, 2014

(54) MULTIPLE-SENSE THERMO-RESISTIVE SENSOR FOR CONTACT DETECTION OF READ-WRITE HEADS

(75) Inventors: Andrew Chiu, San Jose, CA (US); Sujit Kirpekar, Fremont, CA (US); Katalin Pentek, San Jose, CA (US); Oscar J. Ruiz, San Jose, CA (US); David J. Seagle, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 156 days.

(21) Appl. No.: 13/250,204

(22) Filed: Sep. 30, 2011

(65) Prior Publication Data

US 2013/0083430 A1    Apr. 4, 2013

(51) Int. Cl.
 G11B 21/02    (2006.01)
 G11B 5/60    (2006.01)

(52) U.S. Cl.
 CPC .............. *G11B 5/6076* (2013.01); *G11B 5/607* (2013.01)
 USPC .......................................... 360/75; 360/234.3

(58) Field of Classification Search
 None
 See application file for complete search history.

(56) References Cited

U.S. PATENT DOCUMENTS

| 5,808,184 A | 9/1998 | Boutaghou et al. | |
|---|---|---|---|
| 5,825,181 A | 10/1998 | Schaenzer et al. | |
| 6,071,007 A | 6/2000 | Schaenzer et al. | |
| 6,956,707 B2 | 10/2005 | Ottesen et al. | |
| 7,589,928 B2 | 9/2009 | Roy et al. | |
| 7,770,438 B2 | 8/2010 | Kiyono et al. | |
| 7,800,858 B1 * | 9/2010 | Bajikar et al. | 360/75 |
| 7,974,039 B1 * | 7/2011 | Xu et al. | 360/75 |
| 8,139,310 B1 * | 3/2012 | Hogg | 360/75 |
| 8,289,821 B1 * | 10/2012 | Huber | 369/30.03 |
| 2003/0174430 A1 | 9/2003 | Takahashi et al. | |
| 2008/0007871 A1 * | 1/2008 | Kiyono et al. | 360/235.4 |
| 2008/0224526 A1 * | 9/2008 | Tsai | 297/463.1 |
| 2010/0097721 A1 | 4/2010 | Baumgart et al. | |
| 2010/0123966 A1 | 5/2010 | Antoku et al. | |
| 2010/0232067 A1 * | 9/2010 | Liners et al. | 360/234.3 |
| 2011/0149430 A1 * | 6/2011 | Shiramatsu et al. | 360/75 |
| 2011/0216430 A1 * | 9/2011 | Kanaya et al. | 360/31 |
| 2011/0235207 A1 * | 9/2011 | Yang | 360/75 |

FOREIGN PATENT DOCUMENTS

JP         3152774         6/1991

* cited by examiner

*Primary Examiner* — Thang Tran
(74) *Attorney, Agent, or Firm* — Patterson & Sheridan, LLP

(57) ABSTRACT

Techniques of the present invention include detecting a touchdown between a read/write head of a disk drive and a surface of a magnetic disk using multiple touchdown sensors located at an air-bearing surface (ABS). The multiple sensors increase the likelihood that a touchdown event—i.e., a portion of the ABS of the head contacting the underlying magnetic disk surface—will be detected. During touchdown, the portion of the head contacting the magnetic disk generates frictional heat which changes a characteristic (e.g., the electrical resistance) of at least one of the sensors located at the ABS. When the sensors are connected to a detection circuit, the changing characteristic may be monitored to identify a touchdown event. The touchdown sensors may be, for example, electrically connected in either series or parallel to the detection circuit. Thus, as long as the electrical resistance of one of the sensors is changed, a touchdown event may be detected.

20 Claims, 6 Drawing Sheets

MULTIPLE-SENSE THERMO-RESISTIVE SENSOR FOR CONTACT DETECTION OF READ-WRITE HEADS

BACKGROUND OF THE INVENTION

1. Field of the Invention

Embodiments of the present invention generally relate to touchdown detection in a hard drive. And, more specifically, to touchdown detection in a head of a hard drive with multiple touchdown sensors located at an air bearing surface (ABS).

2. Description of the Related Art

Disk drives typically use heads residing on sliders to read from and write to the magnetic media. Read and write transducers residing in the head are flown at a small, controlled spacing above the magnetic medium during read and write operations. Although it is generally desired to operate the head only in close proximity to the disk, the head may contact the magnetic medium. A prolonged contact—e.g., on the order of tens of microseconds or more—is known as a touchdown. Heads typically use a thermal actuator that generates heat to control the head-to-media spacing. Heat generated by the thermal actuator causes thermal expansion of the head which locally reduces the spacing between the head and magnetic media. The thermal actuator can produce heating sufficient enough to cause contact between the head and media—i.e., a touchdown event. This touchdown is intentional and is generally performed on each drive during initial drive calibration. Touchdown may also occur at other times during disk drive operation, for example, due to changes in environmental conditions, operation of the disk drive outside of desired parameters, or contamination of the head or magnetic medium. It may be desirable to accurately detect touchdown in order to limit contact time between the head and disk. Prolonged contact is generally undesirable as it may lead to drive failure.

Accordingly, what is needed is a system and method for providing improved touchdown detection.

SUMMARY OF THE INVENTION

Embodiments of the present invention provide a disk drive that includes a head with a first touchdown sensor and a second touchdown sensor that are both located on the ABS of the head. The head also includes a touchdown sensing circuit configured to detect contact between a portion of the head at the ABS and a magnetic medium by measuring a voltage across, or a current through, a combined resistance of the first and second touchdown sensors.

Embodiments of the present invention include a method of detecting contact between a head of a disk drive and a medium by determining whether a portion of the head at an ABS is contacting the medium by measuring a voltage across or a current through a combined resistance of a first touchdown sensor and a second touchdown sensor. Both the first and second touchdown sensors are located at the ABS of the head. Upon determining that the portion of the head at the ABS contacted the medium, the method transmits a signal indicating that a touchdown event occurred.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention includes a read/write head with multiple touchdown sensors located at an ABS. The multiple sensors increase the likelihood that a touchdown event—i.e., a portion of the ABS of the head contacting the underlying magnetic disk surface—will be detected. During touchdown, contact between the portion of the head and the magnetic disk generates frictional heat which changes a characteristic (e.g., electrical resistance) of at least one of the sensors located at the ABS. When the sensors are connected to a detection circuit, the change characteristic may be monitored to detect a touchdown event. The touchdown sensors may be electrically connected, for example, in either series or parallel to the detection circuit. Thus, as long as the characteristic of one of the sensors is changed, a touchdown event may be detected.

An Example Disk Drive

Figure 1:
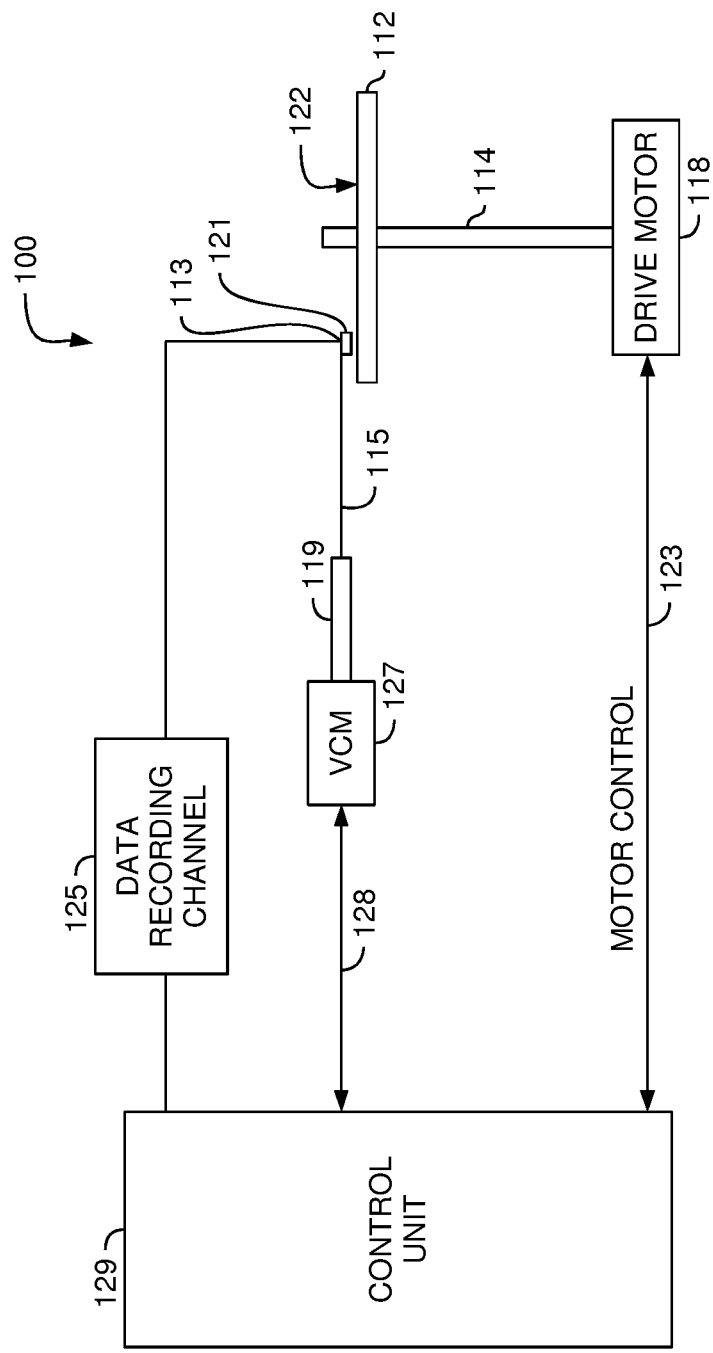
FIG. 1 illustrates a hard disk drive, according to embodiments of the invention.

FIG. 1 illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data is written. Each slider 113 is attached to an actuator arm 119 by way of a suspension 115. The suspension 115 provides a slight spring force which biases the slider 113 towards the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the disk storage system, the rotation of the magnetic disk 112 generates an air bearing between the slider 113 and the disk surface 122 which exerts an upward force or lift on the slider 113. This air bearing counter-balances the slight spring force of suspension 115 and supports slider 113 off and slightly above the disk surface 122 by a small, substantially constant spacing which may be adjusted by using a thermal actuator located in the head 121.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2A:
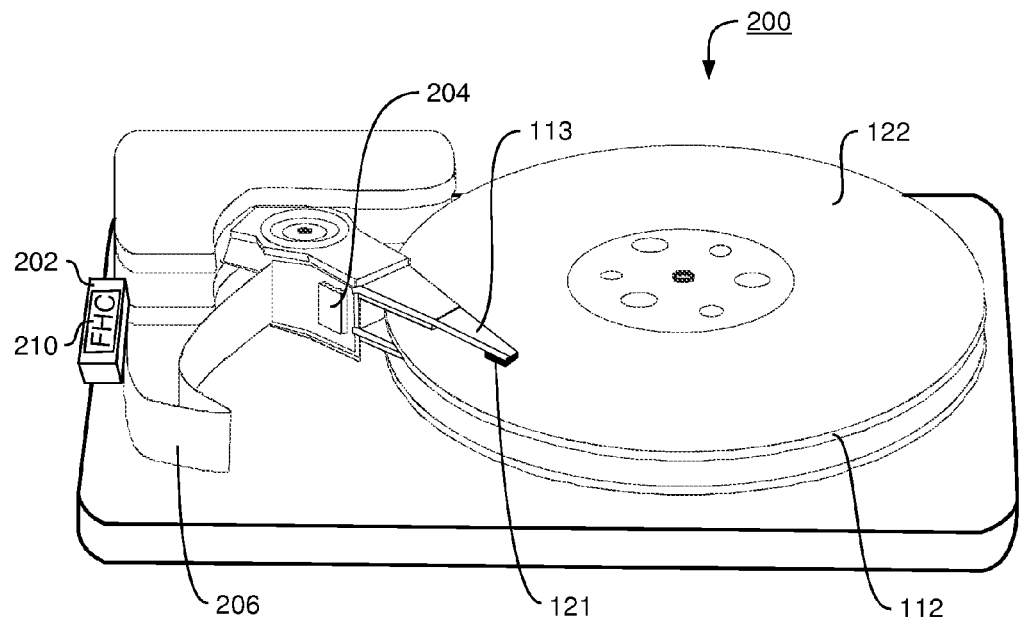
FIGS. 2A-2B illustrate a hard disk drive, according to embodiments of the invention.
Figure 2B:
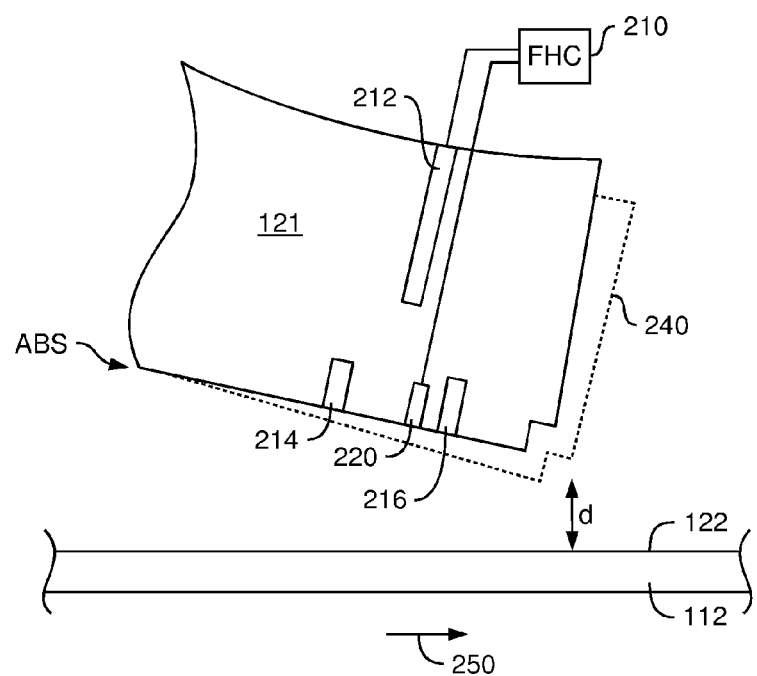

The above description of a typical magnetic disk storage system and the accompanying illustration of FIG. 1 are for representation purposes only. It should be apparent that disk storage systems may contain a large number of disks and actuators, and each actuator may support a number of sliders.
Thermal Fly-Height Control with Thermal Actuators FIGS. 2A-2B illustrate a hard disk drive with thermal fly-height control (TFC), according to embodiments of the invention. The hard drive 200 in FIG. 2A includes many of the same features found in the hard drive 100 of FIG. 1 such as a magnetic disk 112 with a magnetic disk surface 122, magnetic write head assemblies 121 and a slider 113 for positioning the write head assembly 121 over a particular data track. The hard drive 200 also includes a channel 202 coupled to a read/write circuit 204 by a channel interconnect 206. In one embodiment, the channel 202 is an independent integrated circuit with separate inputs and outputs. In another embodiment, the channel 202 is part of larger integrated circuit such as a disk electronic card or a system on a chip (SOC) that performs, for example, the functions of the control unit 129. One function of the channel 202 may be to control the fly-height of the head 121 over the disk surface 122 using a fly-height controller (FHC) 210. In another embodiment, the fly-height of the head may be done as part of the main pre-amp board or the system on a chip (SOC).

As shown in FIG. 2B, the FHC 210 is communicatively coupled to a fly-height actuator 212 which changes the spacing between read/write head 121 and the surface of the disk 122. Fly-height actuator 212 is controlled by the FHC 210. In one embodiment, the fly-height actuator 212 is a thermal actuator located in head 121. Alternatively, the fly-height actuator 212 may be located in the slider 113.

The cross-sectional view of the end portion of head 121 in FIG. 2B shows the read/write head 121 with the thermal fly-height actuator 212 contained therein. The rotation of the disk 122 in the direction of arrow 250 generates an air bearing between the ABS of head 121 and disk surface 122. The read/write head 121 includes a MR read transducer 214 and write transducer 216. In one embodiment, the thermal fly-height actuator 212 is located between the transducers 214, 216.

The thermal fly-height actuator 212 may be an electrically-resistive heating element or heater electrically connected to and controlled by FHC 210. For example, FHC 210 may include a power source and a variable resistor that controls the amount of current delivered to the actuator 212. As the current delivered to the fly-height actuator 212 increases, the resultant heat causes the different elements in the head 121 to expand. This expansion is called pole-tip protrusion (PTP) and is shown by the dashed lines 240. Specifically, PTP is the expansion of the layers of the head 121—e.g., the read and write transducers 214, 216—in a direction towards the disk surface 122. Generally, the distance (d) between the ABS of the head 121 and the disk surface 122 decrease as the thermal fly-height actuator 212 generates heat in the head 121. The FHC 210 may include a temperature feedback control circuit that monitors the temperature of the thermal fly-height actuator 212 to maintain the fly-height of the head 121 within a desired range during operation or testing of the disk drive 200.
Touchdown Detection FIG. 2B also includes a touchdown sensor 220 for detecting a touchdown. When the distance (d) between the head 121 and the disk surface decreases such that a portion of the ABS of the head 121 (e.g., a touchdown region) touches the surface 122, a touchdown event occurs. Frictional heating due to contact between the surface 122 and the head 121 raises the local temperature of the head 121 in the region proximate to where touchdown occurs. Because the touchdown sensor 220 may be in or proximate to this touchdown region, the touchdown sensor 220 is able to detect a local temperature rise. This local temperature rise may persist due to relatively prolonged contact (for example, tens of microseconds) between the head 121 and disk surface 122 during touchdown.

In one embodiment, the touchdown sensor 220 is comprised of a material such that the electrical resistance of the material changes in proportion to the temperature of the material—e.g., a thermistor—though the invention is not limited to such. The material of the touchdown sensor 220 can have either a negative thermal coefficient of resistivity—i.e., the electrical resistance decreases as the temperature increases—or a positive thermal coefficient of resistivity—i.e., the resistance increases as the temperature increases. The touchdown sensor 220 may be electrically connected to the FHC 210 which measures the current running through, or the voltage across, the touchdown sensor 220. If the electrical resistance of the sensor 220 changes in manner indicating that the temperature of the sensor 220 material is increasing, then the FHC 210 may transmit a signal that a touchdown has occurred. An example of a suitable material for the touchdown sensor 220 is Nickel (Ni)-Iron (Fe)—45% Ni and 55% Fe.

Figure 3A:
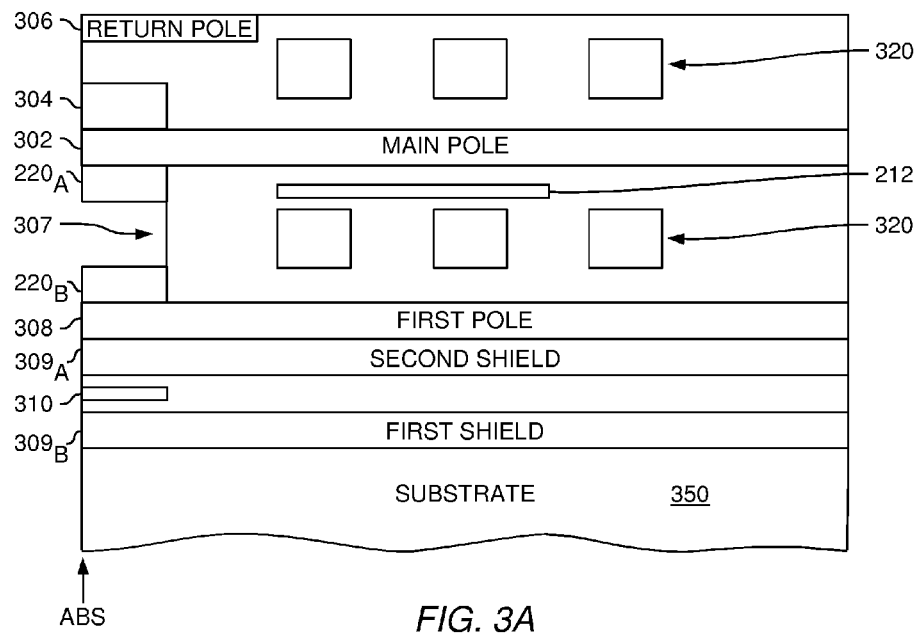
FIGS. 3A-3D illustrate a disk drive head, according to embodiments of the invention.
Figure 3B:
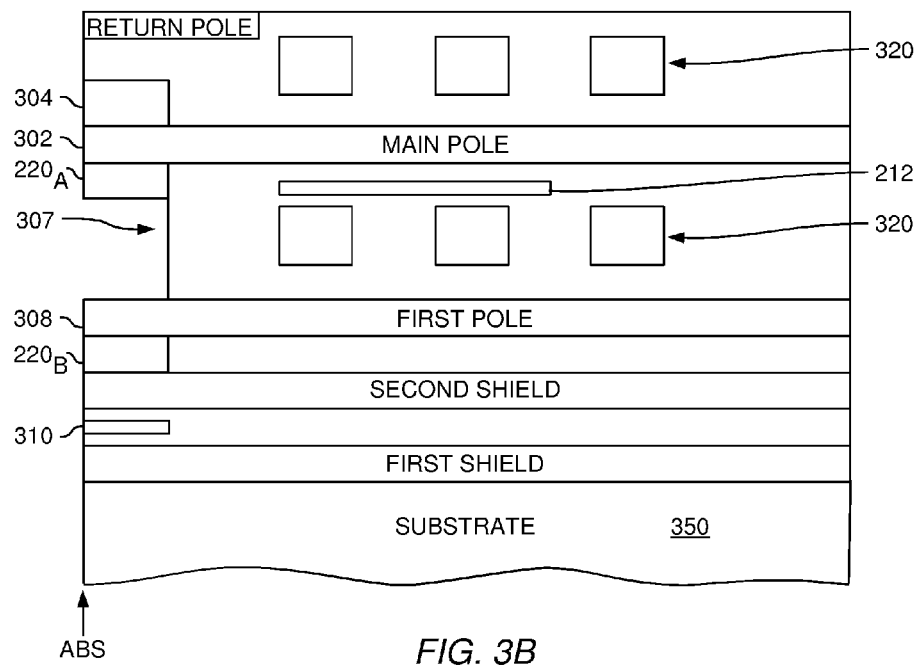

However, the FHC 210 may detect touchdowns with greater accuracy if a portion of the touchdown sensor 220 at the ABS directly contacts the disk surface 122. Because the touchdown sensor 220 would be in frictional contact with the disk surface 122, the sensor 220 does not rely on heat transferring from other components in the head 121 that are in the touchdown region to change the sensor's resistance, and thus, cause the FHC 210 to identify a touchdown.
A Head with Multiple Touchdown Sensors FIGS. 3A-3B illustrate a disk drive head, according to embodiments of the invention. FIG. 3A depicts an exemplary embodiment of a portion of the magnetic head 121. For simplicity, components of the head 121 are omitted and the magnetic media 112 is not shown. The head 121 includes a main pole (or write pole) 302 and a read pole 310. Referring to FIG. 2B, the head 121 may reside on the slider 113 of the disk drive 200. The head 121 is also described in the context of particular components and layers. However, in some embodiments, such layers may include sub-layer(s). In addition, some components may be moved, omitted, or combined with other components.

The read pole 310 is used when reading data from the magnetic disk 112. The shields 309a,b neighbor the read pole 310 and protect the read pole 310 from stray magnetic flux. In one embodiment, the read pole 310 may be a layer in a giant magnetoresistive sensor, such as a tunneling magnetoresistive junction.

When writing data to the magnetic disk 112, the head 121 uses the write pole 302, a first pole 308, wrap around shield (WAS) 304, write coils 320, and a return pole 306. However, these components are not limiting to the invention as one or more components may be omitted or different components may be added. Moreover, although the first pole 308 is shown as separate from shield 309a, in one embodiment, the two layers may be combined.

The head 121 also includes fly-height actuator 212 and touchdown sensors 220. The touchdown sensors 220a,b may comprise of the same material—e.g., NiFe—or different materials. As discussed previously, the fly-height actuator 212 may be used by the FHC 210 to induce touchdown. Specifically, the heat produced by the fly-height actuator 212 may cause the components of the head 121 to bulge towards the disk surface 122—i.e., TFC bulging. When the fly-height actuator 212 generates enough heat, the PTP may be sufficient to cause touchdown. Preferably, the ABS of at least one of the touchdown sensors 220a,b directly contacts the disk surface 122 which more accurately detects a touchdown. For example, if a portion of the head 121 other than the touchdown sensors 220a,b contacts the media 122, the temperature, and thereby, the resistance of touchdown sensors 220a,b may change gradually. Conversely, if the touchdown sensors 220a,b directly contact the media surface 122, the increase in temperature occurs rapidly, making touchdown detection easier. Providing a first touchdown sensor 220a and a second touchdown sensor 220b at different locations of the ABS increase the likelihood that one of the sensors 220a,b will directly contact the disk surface 122.

Even if the two sensors 220a,b do not directly contact the disk surface 122, each sensor may be oriented such that one is located closer to a read or write pole than the other—e.g., touchdown sensor 220a is closer to the write pole 302 while touchdown sensor 220b is closer to the read pole 310. In one embodiment, touchdown sensor 220a may be within 0.25 microns (μm) from write pole 302 while touchdown sensor 220b is within 0.25 μm from read pole 310. Because heat affects the different materials comprising the head 121 differently—i.e., some materials expand faster than others—the PTP caused by the fly-height actuator 212 may be different for each of the layers shown in FIG. 3A. For example, after the fly-height actuator 212 increases the temperature of the head 121, the ABS surface of the first pole 308 may be closer to the disk surface 122 than the ABS surface of the write pole 302. Positioning the touchdown sensors 220a,b at two different locations on the ABS advantageously increases the ability of the sensors 220a,b to detect the frictional heat representing a touchdown even if the PTP is not constant for every material deposited at the ABS.

In one embodiment, both of the touchdown sensors 220a,b are located at the ABS and are both between the write pole 302 and the read pole 310. Additionally, a portion of one or both of the sensors 220a,b may be within 0.25 microns of the poles 302, 310, respectively.

In another embodiment, both of the touchdown sensors 220a,b are located at the ABS and are between the write pole 302 and the first pole 308. Additionally, a portion of the touchdown sensor 220a may be within 0.25 microns of the write pole 302.

In one embodiment, a touchdown sensor 220 is 0.5-1.5 micron wide. In another embodiment, the sensor 220 is 0.1-0.3 micron tall. In another embodiment the sensor 220 is 15-35 nm thick. Moreover, the touchdown sensor 220 may be any combination of dimensions in the range stated previously. Also, the dimensions of the touchdown sensor 220 are not limited to the ranges specifically mentioned. In one embodiment, both the touchdown sensor 220a and 220b have the same dimensions in the ABS surface—i.e., the same width and thickness. In another embodiment, the sensors 220a and 220b have the same width, thickness, and height.

FIG. 3B illustrates a disk drive head with multiple touchdown sensors located at the ABS, according to an embodiment of the invention. Unlike in FIG. 3A, FIG. 3B illustrates a touchdown sensor 220b that is between both the write pole 302 and the read pole 310 as well as between the read pole 310 and the first pole 308.

Figure 3C:
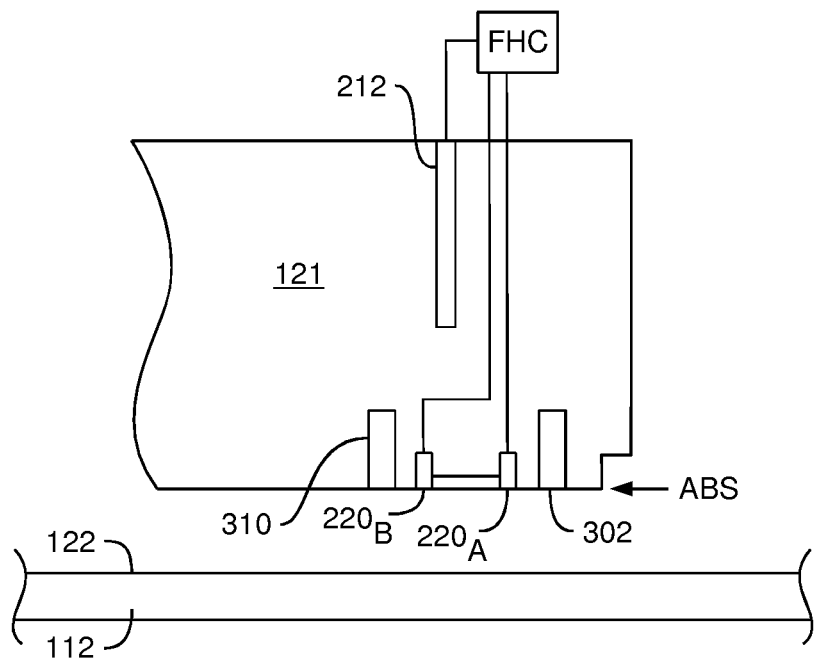
Figure 3D:
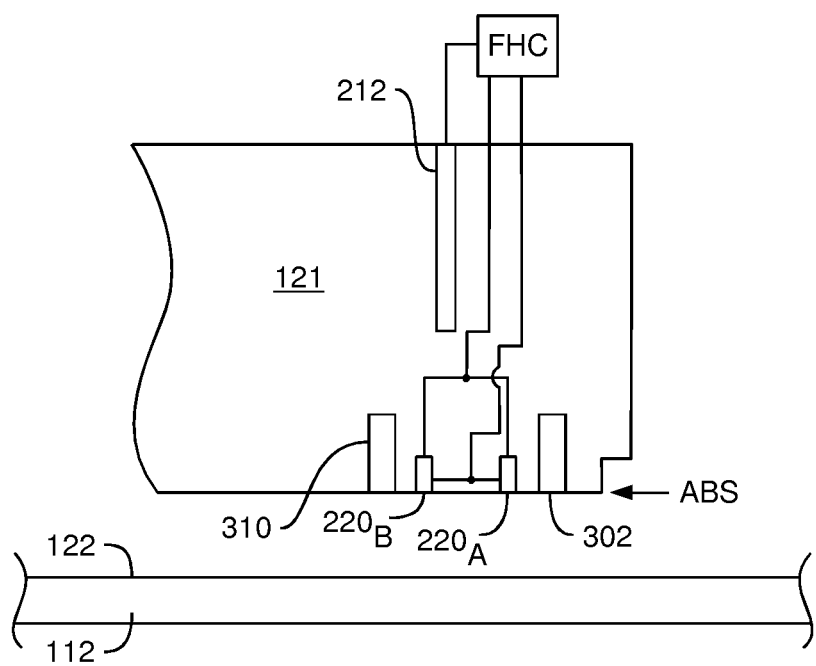

FIGS. 3C-3D illustrate a read/write head 121 with multiple touchdown sensors connected to detection circuitry. In FIG. 3C, the touchdown sensors 220a,b are electrically connected to the FHC 210 in series while in FIG. 3D the touchdown sensors 220a,b are electrically connected to the FHC 210 in parallel. The FHC 210 monitors the combined resistance of the touchdown sensors 220a,b by measuring the current through, or the voltage across, the circuit. By including both sensors in the same electric circuit, the touchdown sensors 220a,b may provide better resolution for detecting a touchdown than using only one sensor. That is, if the resistance of only one of the touchdown sensors 220a,b changes, the FHC 210 may still be able to detect a touchdown.

Moreover, in other embodiments, the head 121 may include more than two touchdown sensors at the ABS to improve resolution and accurately detect touchdown events. These sensors may also be connect in series, parallel, or individually to the FHC 210.

The FHC 210 may determine a touchdown has occurred if the resistance of the both the sensors 220a,b changes. For example, the sensors 220a,b may be wired individually, in series, or in parallel, but the FHC 210 may monitor the combined resistance as well as ensure that the resistance of each individual sensor 220 has changed.

Figure 4A:
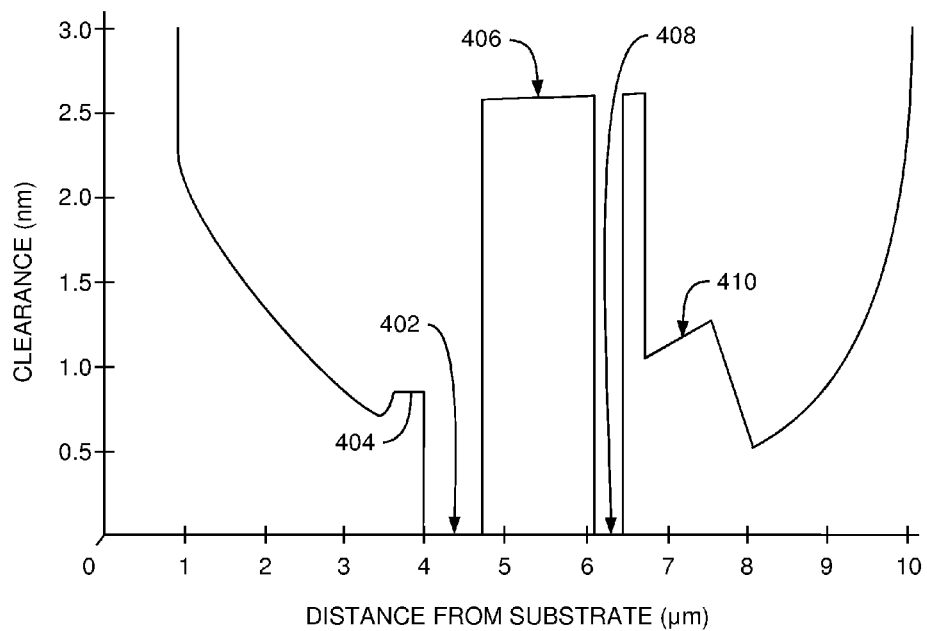
FIGS. 4A-4B are graphs of a disk drive's head profile at an ABS, according to embodiments of the invention.
Figure 4B:
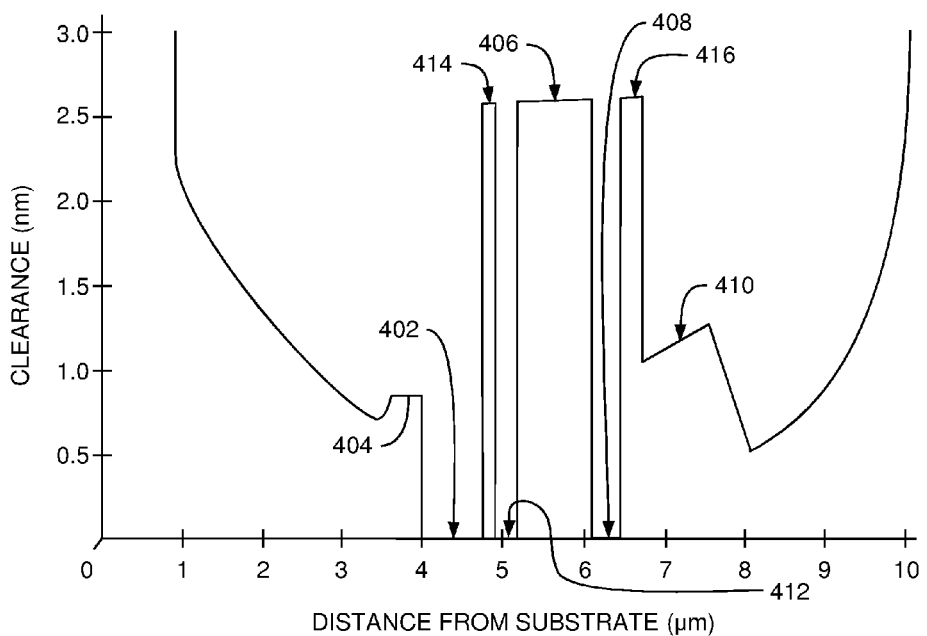

FIGS. 4A-4B are graphs of a disk drive's head profile at an ABS, according to embodiments of the invention. The vertical axes of FIGS. 4A and 4B measure the clearance between a portion of the ABS of the head 121 and the surface of the magnetic disk 122. For the sake of simplicity, it is assumed the surface 122 is perfectly flat. The horizontal axes of FIGS. 4A and 4B measure the distance from the substrate 350 to a portion of the head 121 at the ABS. Unlike in FIGS. 3A and 3B where the head 121 has a substantially flat ABS profile, the head profiles shown in FIGS. 4A and 4B are experiencing uneven PTP which may occur during TFC. This results because of the different materials in the head 121 and their associated thermal expansion rates. For example, assuming no temperature variance in the head 121, if two layers are originally equidistant from the disk surface 122, during TFC, the material deposited on the ABS with the greater thermal expansion rate will contact the disk surface 122 first.

The arrow 404 represents the read pole 310 and the shield 309a in the profile of the head 121. Thus, the ABS portions of the read pole 310 and shield 309a are approximately 0.75 to 0.9 nanometers (nm) away from the disk surface 122, as shown by the vertical axis, and located approximately 3 to 4 μm from the substrate 350, as shown by the horizontal axis. Arrow 402 represents the location of the portion of the first pole 308 at the ABS. In this embodiment, the first pole 308 is contacting the magnetic surface 122—i.e., a touchdown event. Arrow 406 represents the recess 307 where the write coils 320 are recessed away from the ABS; thus, the height of the recess relative to a component on the ABS may be 2.5 nm. Arrow 410 represents the location of the write transducer, e.g., the write pole 302 and the WAS 304. Arrow 408 represents the touchdown sensor 220a that is closer to write pole 302 than read pole 310. The clearance (i.e., vertical axis) associated with arrow 408 illustrates that touchdown sensor 220a is also contacting the disk surface 122. Accordingly, the touchdown sensor 220a does not have to rely on heat transferring from the first pole 308 to the sensor 220a to detect a touchdown—i.e., change the sensor's electrical resistance. In this example, as long as the materials comprising the touchdown sensor 220a and the first pole 308 receive the same amount of heat from the fly-height actuator 212 and have the same thermal expansion rate, the touchdown sensor 220a will contact the disk surface 122 at substantially the same time as the first pole 308. In the profile shown in FIG. 4A, the head has only one touchdown sensor 220a at the ABS.

FIG. 4B shows a profile of a head with two touchdown sensors at the ABS. Specifically, the touchdown sensors 220a,b are located at the positions shown in FIG. 3A. The arrow 412 represents the location of the portion of touchdown sensor 220b at the ABS. In the embodiment shown in FIG. 4B, both the first touchdown sensor 220a and the second touchdown sensor 220b are separated from respective poles by gaps represented by arrows 414 and 416, respectively. By including two touchdown sensors 220a,b at the ABS of a magnetic head, the likelihood that at least one of the touchdown sensors 220a,b will detect a touchdown event increase.

Figure 5A:
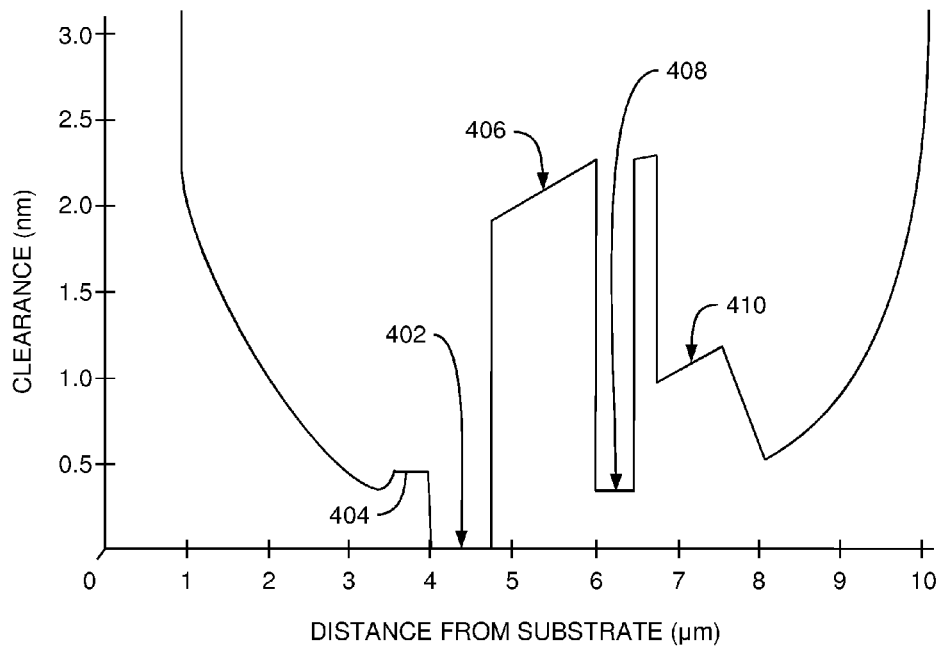
FIGS. 5A-5B are graphs of a disk drive's head profile at an ABS during high heat, according to embodiments of the invention.
Figure 5B:
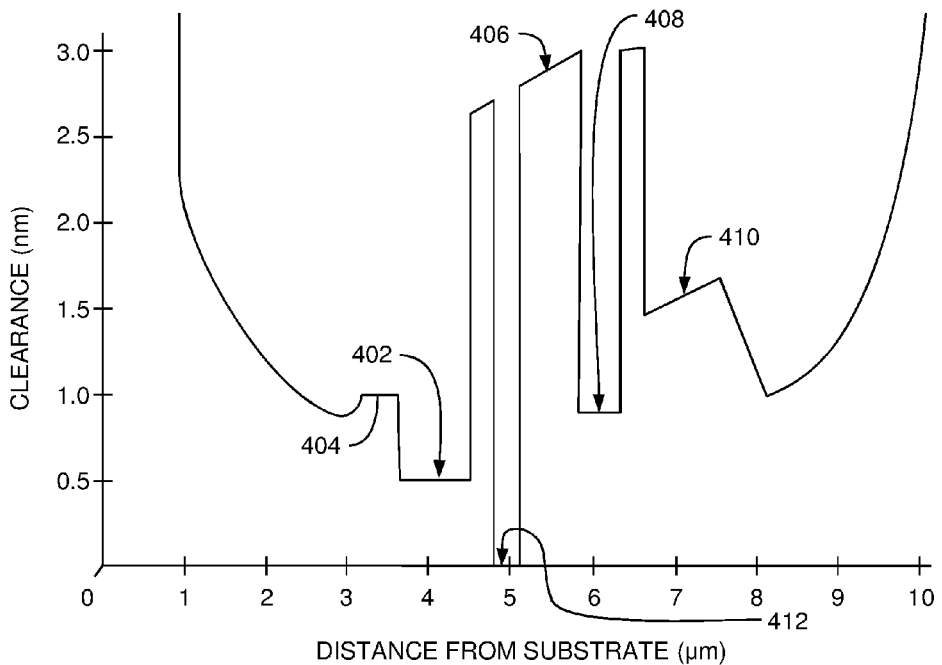

FIGS. 5A-5B are graphs of a disk drive's head profile at an ABS during high heat, according to embodiments of the invention. Like FIGS. 4A-B, the vertical axes of FIGS. 5A and 5B measure the clearance between a portion of the ABS of the head 121 and the surface of the magnetic disk 122. It is also assumed that the surface 122 is perfectly flat. The head profile in FIG. 5A includes only one touchdown sensor at the ABS which is represented by arrow 408. FIGS. 4A and 5A may illustrate head profiles for the same magnetic head 121 at two different temperatures. For example, FIG. 5A may illustrate the head profile at a greater temperature than FIG. 4A. At this greater temperature, the touchdown sensor 220a represented by arrow 408 and the first pole represented by arrow 402 do not touch the disk surface 122 simultaneously. Instead of the touchdown sensor 220a directly contacting the surface 122, the sensor 220a must instead rely on heat transferring from the first pole 308 to the sensor 220a. Meanwhile, the first pole 308 may become damaged by rubbing against the magnetic surface before the touchdown sensor 220a detects the touchdown event. This situational may occur if, for example, the touchdown sensor 220a and the first pole 308 comprise of materials with different thermal expansion rates or if the materials are at different temperatures.

FIG. 5B illustrates a head profile under high heat with two touchdown sensors located at the ABS. The head 121 illustrated by FIG. 5B includes a second touchdown sensor 220b represented by arrow 412 which shows that the sensor 220b is contacting the disk surface 122. In one embodiment, the head 121 associated with FIG. 5B may be at the same high temperature as the head 121 associated with FIG. 5A. As shown, the first pole 308 (i.e., arrow 402) does not contact the surface 122 before the touchdown sensor 220b (i.e., arrow 412). This may protect the first pole 308 from prolonged rubbing against the disk surface 122.

In one embodiment, each touchdown sensors 220a,b may comprise of materials with a similar thermal expansion rate as a layer that it is in close proximity with. For example, the touchdown sensor 220a may have a similar thermal expansion rate as the write pole 302 or WAS 304 while the touchdown sensor 220b may have a similar thermal expansion rate of the first pole 308 or read pole 310. Accordingly, the sensors 220a,b may have different thermal expansion rates to match the expansion rates of the closest layers of the head 121.

Moreover, depending on the different methods and materials that may be used to manufacture a read/write head 121, using multiple touchdown sensors 122 at the ABS increases the likelihood that at least one of the sensors 220a,b will directly contact the surface 122. For example, even though FIGS. 5A-B show the first pole 308 as having the least clearance, in other embodiments the write pole 302 or the WAS 304 may have the greatest PTP and the least amount of clearance. The region of the ABS of the head 121 that contacts the ABS during a touchdown event may depend on a temperature gradient within the head 121, the different thermal expansion rates of the layers, or the initial distance—i.e., without the fly-height actuator 212 supplying heat—between the respective layers comprising the head 121 and the disk surface 122.

The benefits of this invention are not limited, however, to the embodiment where one of the touchdown sensors 220a,b contacts the disk surface 122 before any other layer of the head 121—i.e., the situation illustrated in FIG. 5B. Instead, providing at least two or more touchdown sensors at the ABS at different locations increases the likelihood that heat transferring from a layer on the head 121 that is contacting the surface 122 will be detected by a sensor before damage to contacting layer may result. That is, the additional sensors at the ABS may shorten the distance that frictional heat generated by a touchdown event must travel to reach one of the touchdown sensors 220a,b.

While the foregoing is directed to embodiments of the present invention, other and further embodiments of the invention may be devised without departing from the basic scope thereof, and the scope thereof is determined by the claims that follow.

What is claimed is:

1. A disk drive comprising:
   a head comprising:
      a fly-height actuator disposed within the head;
      a first touchdown sensor; and
      a second touchdown sensor, wherein both the first and second touchdown sensors are located at an air bearing surface (ABS) of the head; and
   a touchdown sensing circuit configured to detect contact between a portion of the head at the ABS and a magnetic medium by measuring a voltage across, or a current through, a combined resistance of the first and second touchdown sensors, wherein a surface of the head is recessed from the ABS forming a recess between the first touchdown sensor and the second touchdown sensor, wherein at least one of the first touchdown sensor and the second touchdown sensor borders the recess.

2. The disk drive of claim 1, wherein the first and second touchdown sensors are electrically connected at least one of in series and in parallel to the touchdown sensing circuit.

3. The disk drive of claim 1, wherein the touchdown sensing circuit is configured to detect contact between a portion of the head at the ABS and the magnetic medium only if an electrical resistance of both the first and second touchdown sensors changes.

4. A disk drive comprising:
a head comprising:
a first touchdown sensor; and
a second touchdown sensor, wherein both the first and second touchdown sensors are located at an air bearing surface (ABS) of the head;
a touchdown sensing circuit configured to detect contact between a portion of the head at the ABS and a magnetic medium by measuring a voltage across, or a current through, a combined resistance of the first and second touchdown sensors;
a write pole for writing data to the medium; and
a return pole for writing data to the medium, wherein portions of both the write and write poles are located at the ABS, and wherein the first and second touchdown sensors are both located between the write and return poles.

5. A disk drive comprising:
a head comprising:
a first touchdown sensor; and
a second touchdown sensor, wherein both the first and second touchdown sensors are located at an air bearing surface (ABS) of the head;
a touchdown sensing circuit configured to detect contact between a portion of the head at the ABS and a magnetic medium by measuring a voltage across, or a current through, a combined resistance of the first and second touchdown sensors;
a write pole for writing data to the medium; and
a read pole for reading data from the medium, wherein portions of both the read and write poles are located at the ABS, wherein the first and second touchdown sensors are both located between the read and write poles.

6. A disk drive comprising:
a head comprising:
a first touchdown sensor; and
a second touchdown sensor, wherein both the first and second touchdown sensors are located at an air bearing surface (ABS) of the head;
a touchdown sensing circuit configured to detect contact between a portion of the head at the ABS and a magnetic medium by measuring a voltage across, or a current through, a combined resistance of the first and second touchdown sensors;
a write pole for writing data to the medium; and
a read pole for reading data from the medium, wherein portions of both the read and write poles are located at the ABS, wherein the first touchdown sensor is closer to the portion of the write pole located at the ABS than the second touchdown sensor, and wherein the second touchdown sensor is closer to the portion of the read pole located at the ABS than the first touchdown sensor.

7. The disk drive of claim 6, wherein a portion of the first touchdown sensor is located not more than 0.25 microns from the portion of the write pole located at the ABS.

8. The disk drive of claim 7, further comprising a return pole located between the write pole and the read pole, wherein the second touchdown sensor is located between the return pole and the write pole.

9. The disk drive of claim 8, wherein a portion of the second touchdown sensor is located not more than 0.25 microns from a portion of the return pole located at the ABS.

10. The disk drive of claim 5, wherein a portion of the second touchdown sensor is located not more than 0.25 microns from the portion of the read pole.

11. A method of detecting contact between a head of a disk drive and a medium, comprising:
determining whether a portion of the head at an air bearing surface (ABS) is contacting the medium by measuring a voltage across, or a current through, a combined resistance of a first touchdown sensor and a second touchdown sensor, wherein both the first and second touchdown sensors are located at the ABS of the head, wherein a surface of the head is recessed from the ABS forming a recess between the first touchdown sensor and the second touchdown sensor, wherein at least one of the first touchdown sensor and the second touchdown sensor borders the recess, and wherein the head includes a fly-height actuator disposed within the head; and
upon determining that the portion of the head at the ABS contacted the medium, transmitting a signal indicating that a touchdown event occurred.

12. A method of detecting contact between a head of a disk drive and a medium, comprising:
determining whether a portion of the head at an air bearing surface (ABS) is contacting the medium by measuring a voltage across, or a current through, a combined resistance of a first touchdown sensor and a second touchdown sensor, wherein both the first and second touchdown sensors are located at the ABS of the head, and wherein the first and second touchdown sensors are both located between a read pole and a write pole of the head; and
upon determining that the portion of the head at the ABS contacted the medium, transmitting a signal indicating that a touchdown event occurred.

13. A method of detecting contact between a head of a disk drive and a medium, comprising:
determining whether a portion of the head at an air bearing surface (ABS) is contacting the medium by measuring a voltage across, or a current through, a combined resistance of a first touchdown sensor and a second touchdown sensor, wherein both the first and second touchdown sensors are located at the ABS of the head, and wherein the first touchdown sensor is closer to a portion of the write pole located at the ABS than the second touchdown sensor, and wherein the second touchdown sensor is closer to a portion of the read pole located at the ABS than the first touchdown sensor; and
upon determining that the portion of the head at the ABS contacted the medium, transmitting a signal indicating that a touchdown event occurred.

14. The method of claim 12, wherein a portion of the first touchdown sensor is located not more than 0.25 microns from the portion of the write pole located at the ABS.

15. The method of claim 12, wherein a return pole is located between the write pole and the read pole, and wherein the second touchdown sensor is located between the return pole and the write pole.

16. The method of claim 12, wherein a portion of the second touchdown sensor is located not more than 0.25 microns from a portion of the read pole located at the ABS.

17. A method of detecting contact between a head of a disk drive and a medium, comprising:
determining whether a portion of the head at an air bearing surface (ABS) is contacting the medium by measuring a voltage across, or a current through, a combined resistance of a first touchdown sensor and a second touchdown sensor, wherein both the first and second touchdown sensors are located at the ABS of the head, and wherein the signal indicating that the touchdown occurred is transmitted only if the electrical resistance of both the first and second sensors changes; and upon determining that the portion of the head at the ABS contacted the medium, transmitting a signal indicating that a touchdown event occurred.

18. The method of claim 11, wherein the first and second touchdown sensors are electrically connected in series to a touchdown sensing circuit.

19. The method of claim 11, wherein the first and second touchdown sensors are electrically connected in parallel to a touchdown sensing circuit.

20. The method of claim 11, wherein an electrical resistance of the first and second sensors changes when a portion of the ABS contacts the medium.

* * * * *